United States Patent
Ma et al.

(10) Patent No.: US 10,892,940 B2
(45) Date of Patent: Jan. 12, 2021

(54) SCALABLE STATISTICS AND ANALYTICS MECHANISMS IN CLOUD NETWORKING

(71) Applicant: Cisco Technology, Inc., San Jose, CA (US)

(72) Inventors: Sherman Ma, Sunnyvale, CA (US); Kalyan Ghosh, Saratoga, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 440 days.

(21) Appl. No.: 15/656,119

(22) Filed: Jul. 21, 2017

(65) Prior Publication Data

US 2019/0028325 A1   Jan. 24, 2019

(51) Int. Cl.
| | |
|---|---|
| *H04L 12/24* | (2006.01) |
| *H04L 12/26* | (2006.01) |
| *G06F 9/455* | (2018.01) |
| *H04L 29/08* | (2006.01) |

(52) U.S. Cl.
CPC ........ *H04L 41/046* (2013.01); *G06F 9/45558* (2013.01); *H04L 41/5096* (2013.01); *H04L 43/04* (2013.01); *H04L 43/062* (2013.01); *H04L 67/10* (2013.01); *G06F 2009/45595* (2013.01)

(58) Field of Classification Search
CPC .............. G06F 9/45558; H04L 41/046; H04L 41/5096; H04L 43/04; H04L 43/062; H04L 67/10
See application file for complete search history.

(56) References Cited

U.S. PATENT DOCUMENTS

| | | | |
|---|---|---|---|
| 5,812,773 A | 9/1998 | Norin | |
| 5,889,896 A | 3/1999 | Meshinsky et al. | |
| 6,108,782 A | 8/2000 | Fletcher et al. | |
| 6,178,453 B1 | 1/2001 | Mattaway et al. | |
| 6,298,153 B1 | 10/2001 | Oishi | |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Al-Harbi, S.H., et al., "Adapting k-means for supervised clustering," Jun. 2006, Applied Intelligence, vol. 24, Issue 3, pp. 219-226.

(Continued)

*Primary Examiner* — Philip J Chea
*Assistant Examiner* — Mohammed Ahmed
(74) *Attorney, Agent, or Firm* — Polsinelli PC (57) ABSTRACT

Systems, methods, and computer readable storage mediums are disclosed for scalable data collection and aggregation of statistics for logical objects of an application centric network. An analytics agent running on a logical object of an application centric network is elected as one of a Designated Stats device (DSD) or a Member Stats device (MSD). If the analytics agent is defined as a DSD, the analytics agent receives data reported from a downstream MSD communicated over the analytics plane and aggregates data from the MSD belonging to the same access control list rule. If the analytics agent is defined as an MSD, the analytics agent selects a DSD and reports the statistics to that DSD over the analytics plane.

20 Claims, 6 Drawing Sheets

(56) References Cited

U.S. PATENT DOCUMENTS

| | | |
|---|---|---|
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0177594 A1* | 8/2007 | Kompella .............. H04L 12/185 370/390 |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |

(56) References Cited

U.S. PATENT DOCUMENTS

| | | |
|---|---|---|
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |

(56) References Cited

U.S. PATENT DOCUMENTS

| | | |
|---|---|---|
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0173331 A1* | 6/2014 | Martin ............ G06F 11/2002 714/4.11 |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0333992 A1* | 11/2015 | Vasseur ............ H04L 12/4633 370/252 |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0212048 A1* | 7/2016 | Kaempfer ............ H04L 45/745 |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Bohner, Shawn A., "Extending Software Change Impact Analysis into COTS Components," 2003, IEEE, 8 pages.

Hood, C. S., et al., "Automated Proactive Anomaly Detection," 1997, Springer Science and Business Media Dordrecht, pp. 688-699.

Vilalta R., et al., "An efficient approach to external cluster assessment with an application to martian topography," Feb. 2007, 23 pages, Data Mining and Knowledge Discovery 14.1: 1-23. New York: Springer Science & Business Media.

Amedro, Brian, et al., "An Efficient Framework for Running Applications on Clusters, Grids and Cloud," 2010, 17 pages.

Author Unknown, "A Look at DeltaCloud: The Multi-Cloud API," Feb. 17, 2012, 4 pages.

(56) References Cited

OTHER PUBLICATIONS

Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework environments," original published on or about Feb. 11, 2012; 1 page; http://www.css-cloud.com/platform/enterprise-cloud-gateway.php.
Fang K., "LISP MAC-EID-To-RLOC Mapping (LISP based L2VPN)," Network Working Group, Internet Draft, Cisco Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

(56) References Cited

OTHER PUBLICATIONS

Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
International Search Report and Written Opinion, dated Sep. 26, 2018, 15 pages, for the International Searching Authority, for the corresponding International Application No. PCT/US2018/042609.
"Data-Over-Cable Service Interface Specifications DOCSIS 2.0, Operations Support System Interface Specification, CM-SP-OSSIv2.0-I10-070803," Digital Video Broadcasting, C/O EBU—17A Ancienne Route—CH-1218 Grand Saconnex, Geneva, Switzerland, Aug. 3, 2007, 171 pages, part 1 of 2.
"Data-Over-Cable Service Interface Specifications DOCSIS 2.0, Operations Support System Interface Specification, CM-SP-OSSIv2.0-I10-070803," Digital Video Broadcasting, C/O EBU—17A Ancienne Route—CH-1218 Grand Saconnex, Geneva, Switzerland, Aug. 3, 2007, 237 pages, part 2 of 2.
"OpenCable Specifications, OpenCable Receiver Metrics Gathering Specification, OC-SP-Metrics-I02-070416," CableLabs, Apr. 16, 2017, 26 pages.

\* cited by examiner

SCALABLE STATISTICS AND ANALYTICS MECHANISMS IN CLOUD NETWORKING

TECHNICAL FIELD

The present disclosure pertains to cloud networking, and more specifically to a scalable statistics and analytics mechanism for statistics aggregation in large-scale data center/cloud networking environments.

BACKGROUND

In a typical cloud data center fabrics, statistics collection and management plays an important role in tenant traffic visibility and monitoring in data center and cloud networking environments. With the introduction of virtual switch and container networking, the number of switches (either physical or virtual) and end-points (either virtual machine or containers) explodes. Some devices fail to have enough resources to handle the increasing amounts of switches and end-points being added. Moreover, traffic and routes between end-points change dynamically due to virtual machine and container migration. Therefore a more systematic mechanism to address scalable and flexible statistics collection and management is needed to tackle these new challenges.

In addition, in current network statistics collection processes, each physical network switch or router collects data traffic statistics on observable objects, such as network interfaces, learned endpoints, ACL (Access Control) rules, etc. Each physical network switch or router then reports the collected statistics to a central place, such as a SDN controller or a remote server. With the introduction of virtual switches and containers, some types of observables, such as an ACL rule between end-point groups, can be installed on multiple switches in the cloud. Since end-points migrate between hosts in cloud environments, those types of observables will be distributed in the cloud, often distributed dynamically as virtual machines and containers migrate. Accordingly, a way of summarizing and aggregating statistics from devices within the cloud is needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

A system, method, and computer readable storage medium is disclosed for scalable data collection and aggregation of statistics for logical objects of an application centric network. In one aspect, an analytics agent running on a logical object (e.g., a stats device) of an application centric network is configured or elected to act as one of a Designated Stats device (DSD) and/or a Member Stats device (MSD). If the analytics agent acts as a DSD, the analytics agent receives data reported from its downstream MSD's communicated over the analytics plane. Statistics data from the MSD's belonging to the same access control list rule is aggregated in the analytics agent acting as a DSD. If the analytics agent is defined as an MSD, the analytics agent selects its DSD and reports the statistics to that DSD over the analytics plane. A D-MSD device acts as both a DSD for its downstream MSD's and an MSD for its upstream DSD.

Example Embodiments

The disclosed technology addresses the need in the art for providing a systematic mechanism for enabling scalable and flexible statistics collection and management. A distributed approach is disclosed that establishes an analytics plane (besides, for example in some embodiments, a data plane, control plane, and management plane) over different analytics tiers of physical or virtual network devices across data center or cloud networking environments. This distributed approach makes the statistics collection and management process(es) scalable in clouds with explosive numbers of end-points (e.g., in the form of virtual machines or containers) and large numbers of virtual switches connecting those endpoints. Moreover, the distributed approach is adaptive to end-point migration and dynamic traffic conditions.

Figure 1:
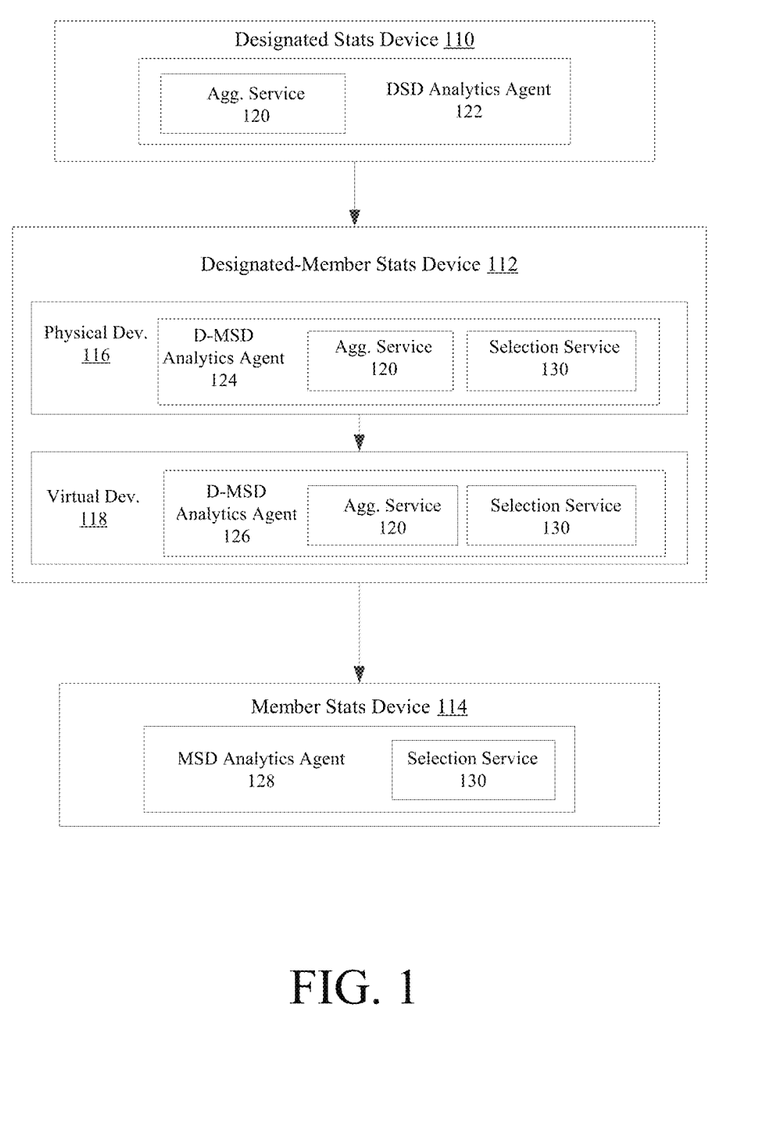
FIG. 1 shows an example block diagram illustrating example tiers and role hierarchy on an analytics plane.

FIG. 1 shows an example block diagram illustrating example tiers and role hierarchy on an analytics plane. A system for data collection and aggregation for logical objects of an application centric network is shown. In some embodiments, the analytics plane is a separate overlay plane, different from an existing control plane and data plane in a networking domain, for statistics collection and aggregation in the cloud. The analytics plane comprises a collection of analytics agents communicating with each other, with an analytics agent running on each logical object of the application centric network. The logical object can be, for example, a stats device.

An analytics agent is installed on each stats device on the analytics plane. Thus, DSD analytics agent 122 is installed on each DSD 110; D-MSD analytics agents 124, 126 are installed on each physical D-MSD 116 and virtual D-MSD 118, respectively; and MSD analytics agent 128 is installed on each MSD 114. Each analytics agent has one or more of aggregator service 120 and/or selection service 130 that aggregates statistics from downstream devices and selects upstream devices, respectively.

The analytics agents aggregate statistics and/or data concurrently from multiple member devices (e.g., one or more MSDs) into one observable object on a designated device (e.g., a DSD). The aggregated statistics may be any data associated with a member device, such as data related to memory usage, CPU time, storage and memory resources, disk use, speed, etc.

In some embodiments, all stats devices on the analytics plane are classified into different tiers based on their statistics processing resources, such as, but not limited to, CPU and storage. For example, in FIG. 1, devices in a modern data center networking topology can comprise one or more of Designated Stats Devices 110 (DSD), Designated-Member Stats Devices 112 (D-MSD), and/or 114 Member Stats Devices 114 (MSD). These devices can be classified into at least two tiers on the analytics plane (e.g., a first tier comprising DSD 110 and a second tier comprising MSD 114), although the analytics plane can comprise any number of tiers.

In the embodiments shown in FIG. 1, for example, four tiers are shown, with tier 1 comprising DSD 110, tier 2 comprising physical D-MSD 116, tier 3 comprising virtual D-MSD 118, and tier 4 comprising MSD 114. Each tier is connected to one or more devices on the tier below. An example topology can define tiers as:

Tier 1: Controller device
Tier 2: Physical switches/routers
Tier 3: Virtual switches
Tier 4: End-points In embodiments, tier 1 devices are the terminal statistics processing devices on the analytics plane, while each tier below (e.g., tier 2 to tier 4) comprises statistics device(s) that need to either collect statistics, report statistics to another upstream device, or both. Each device's upstream device is called a designated device, which is then used for aggregating statistics from the device and other devices that have also designated the upstream device as its designated device. All stats devices that select the same upstream device as their designated device are called that upstream device's member devices. Typically, tier 1 to tier 3 statistics devices can act as designated devices, while tier 4 devices can only act as member devices. Tier 4 devices are typically an end-point and/or an end-point group.

In addition, tier 2 and tier 3 devices can be both a member device of its upstream designated device, and a designated device of its downstream member devices. These devices are known as D-MSD devices 112. D-MSD devices 112 can be split into different tiers based on whether they are physical switches and routers (e.g., physical D-MSD 116 comprising tier 3) or virtual switches (e.g., virtual D-MSD 118 comprising tier 4).

Accordingly, in FIG. 1, DSD 110 can be the designated device of D-MSD 112 and/or physical D-MSD 116; physical D-MSD 116 can be the designated device of virtual D-MSD 118; and D-MSD 112 and/or virtual D-MSD 118 can be the designated device of MSD 114. It then follows that MSD 114 can be a member device of virtual D-MSD 118 and/or D-MSD 112; virtual D-MSD 118 can be a member device of physical D-MSD 116; and physical D-MSD 116 and/or D-MSD 112 can be a member device of DSD 110.

Designated devices and member devices are simply roles programmatically determined or assigned to network devices on the analytics plane. Each designated device will perform statistics aggregation and management for a group of member devices. The statistics collecting agent (e.g., aggregation service 120) on each device will collect statistics from all its member devices. Aggregation service 120 on each device reports the statistics to its designated device, whereafter aggregation service 120 on the designated device will perform the aggregation.

Figure 2:
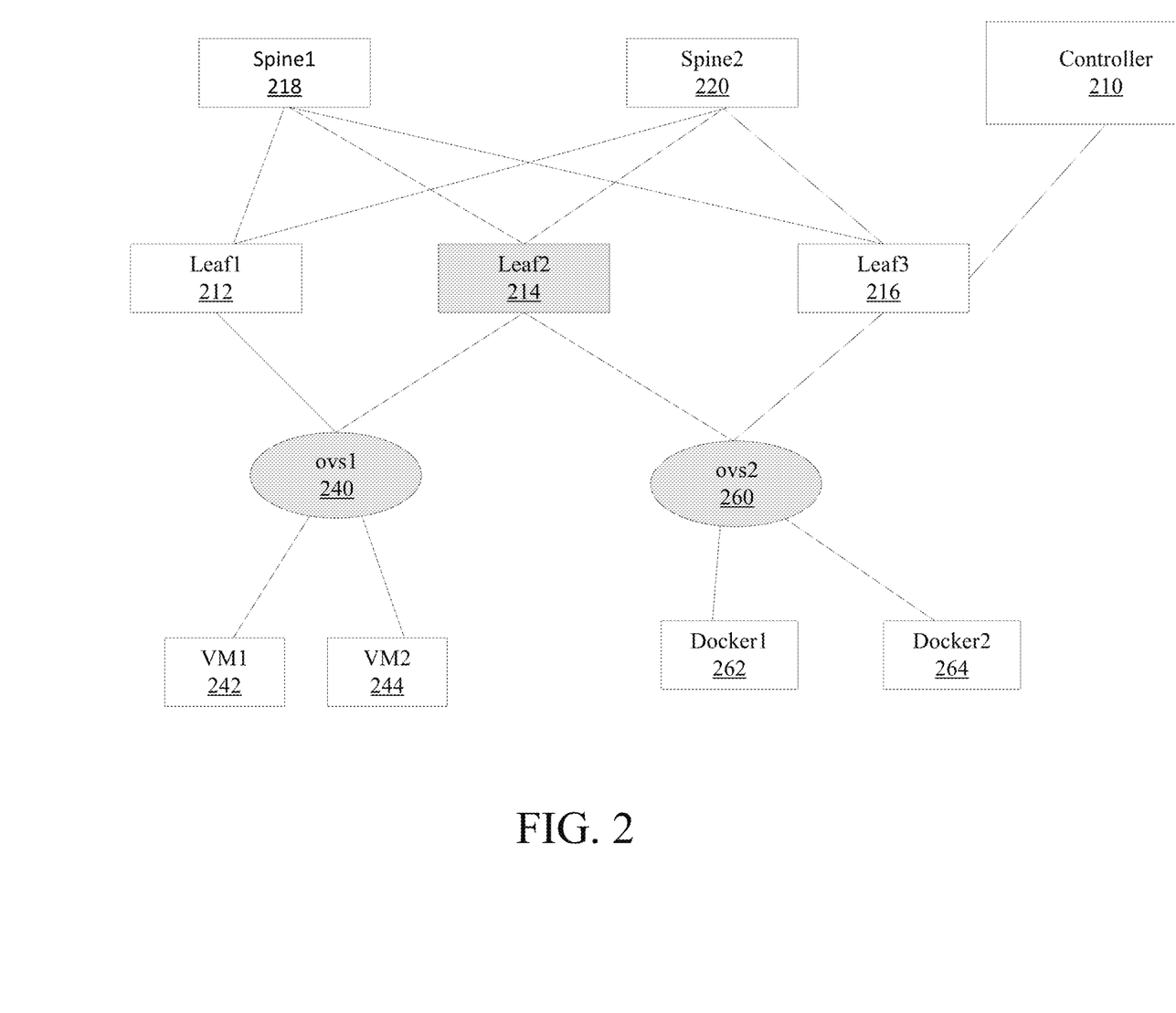
FIG. 2 shows a possible networking topology of devices in a data center/cloud, in accordance with various embodiments.

FIG. 2, for example, shows a possible networking topology of stats devices in a data center/cloud, in accordance with various embodiments. In FIG. 2, the networking fabric consists of controller 210, leaf physical switches (leaf1 210, leaf2 214, and leaf3 216), and spine physical switches (spine1 218 and spine2 220). Controller 210 may be an SDN controller (apic1) or similar Controller 210 and virtual switches (e.g., Open vSwitch switches 240 ovs1 and ovs2 260) can be connected to the leaf switches, and each virtual switch has some end points in the form of one or more end-point groups comprising virtual machines (e.g., vm1 242 and vm2 244) and/or containers (e.g., docker1 262 and docker2 264).

In FIG. 2, ovs1 240 is a designated device of end-points VM1 242 and VM2 244. ovs1 240 aggregates statistics from its member devices VM1 242 and VM2 244. Similarly, ovs2 260 is a designated device of end-points Docker1 262 and Docker2 264. Statistics from member devices Docker1 262 and Docker2 264 are aggregated at ovs2 260.

However, ovs1 240 and ovs2 260 are D-MSD devices, in that while they are designated devices for VM1 242 and VM2 244, and Docker1 262 and Docker2 264, respectively, they are also member devices. Both ovs1 240 and ovs2 260 are member devices to leaf2 214, which aggregates statistics reported from ovs1 240 and ovs2 260.

Leaf2 214 reports statistics to controller 210, thus making leaf2 214 a D-MSD device as well. Controller 210 is a DSD 110 that aggregates the entire set of statistics and does not report to any upstream device.

Figure 3:
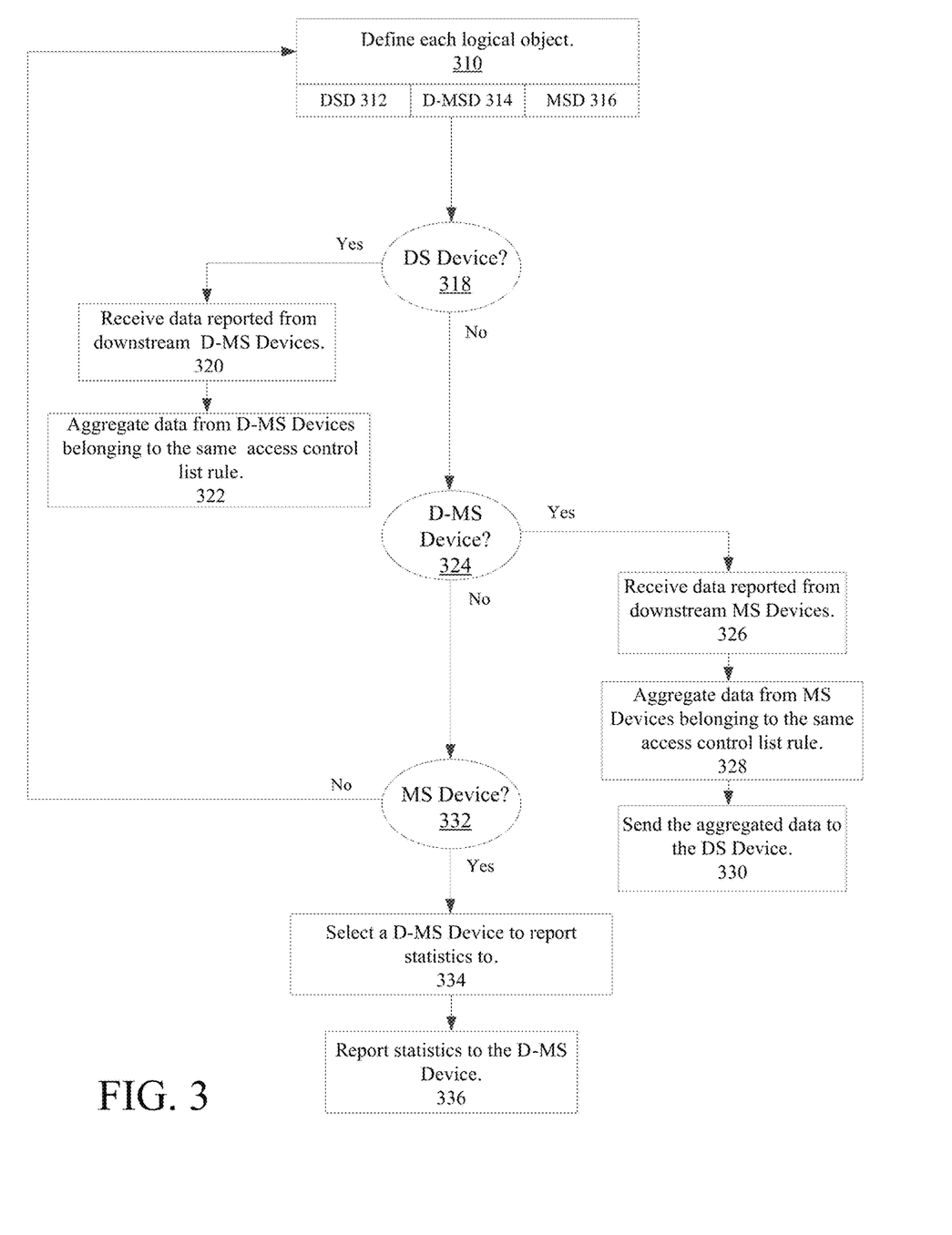
FIG. 3 is a flowchart illustrating an exemplary method for statistics aggregation over the analytics plane.

In embodiments, the network topology and statistics aggregation are automatic processes. FIG. 3, for example, shows a flowchart illustrating an exemplary method for statistics aggregation over the analytics plane. An analytics agent is installed on each stats device. For each analytics agent, each logical object/stats device is defined (step 310) as either a DSD (312), a combined D-MSD (314), or an MSD (316). Tier 1 or DSD devices are the most powerful, while the lowest tier or MSD devices are the least powerful. The DSD, D-MSD, and MSD are classified into a hierarchical topology (as opposed to a cluster), where the hierarchical topology comprises a plurality of tiers based on a resource of each device.

While stats devices can be configured by a user, in some embodiments the analytics agent automatically defines which tier and/or type of device the stats device is based on the device's existing computing resources or the resources that can be spared for statistics collection and aggregation. For example, devices running lots of other tasks and leaving little to statistics aggregation may be placed on a lower tier despite the fact that it has large overall resources, while devices that otherwise would be idle may be placed on a higher tier relative to a more powerful, but more occupied device despite having lower overall resources. The analytics agent can talk at the OS level to figure out its underlying device's storage resources, memory resources, disk use, CPU, speed, etc. to define its tier and/or device type.

In some embodiments, since physical switches typically have more CPU and storage resources, for each virtual switch in a host with multiple end-points (such as virtual machines or containers), a physical switch that its host is connected to will be elected as its designated device. When multiple physical switches are connected to the vswitch host, one will be selected based on the ip address.

Referring back to FIG. 3, if the stats device is defined as a DSD 110 (step 318), DSD analytics agent 122 receives data reported from downstream member devices a tier below (step 320), such as D-MSD 112. DSD analytics agent 122 then aggregates reported data from D-MSD devices 112 belonging to the same ACL rule (step 322).

However, if the stats device is defined as an D-MSD 112 (step 324), D-MSD analytics agent 124, 126 receives data reported from its downstream member devices (step 326), such as MSD 114. D-MSD analytics agent 124, 126 then aggregates data from MSD devices 114 belonging to the same ACL rule (step 328). The aggregated data is then sent to a selected DSD 110 for reporting (step 330).

Finally, if the stats device is defined as an MSD 114 (step 332), MSD analytics agent 128 selects a D-MSD 112 to report statistics to (step 334) and then reports statistics to the selected D-MSD 112 (step 336).

To support aggregating statistics concurrently from multiple member devices into one observable object on a designated device, each member device reports accumulative statistics counters in the form of delta (the delta being a change between the current value and a previous value) instead of the current value itself. This ensures that statistics from multiple member device sources will be added up correctly and maintain order consistency instead of overwriting each other.

For example, referring to FIG. 2, both ovs1 240 and ovs2 260 will report the statistics counters of a distributed observable rule to leaf2 214 to get aggregated there. Reporting delta values instead of the current value has a number of benefits. For example, if both ovs1 240 and ovs2 260 reported its current value, R.counter(ovs1) and R.counter(ovs2), respectively, the current value of leaf2 214 (e.g., R.counter(leaf2)) would be either R.counter(ovs1) or R.counter(ovs2) depending on the order of reporting, and the result is only one of the member device's statistics value—not the aggregated value. But if, as is done herein, both ovs1 240 and ovs2 260 report its delta value R.delta(ovs1) and R.delta(ovs2) respectively, R.counter(leaf2) can be aggregated independently of the order of which member device's reporting is processed first, but using the formula:

$$R.counter(leaf2)=R.counter(leaf2)+R.delta(ovs1) \text{ and } R.delta(ovs2)$$

In embodiments, moreover, a pull model rather than a push model is used for statistics aggregation. Each designated device, for example, pulls the statistics from its downstream member devices. In some embodiments, each (physical or virtual) switch collects statistics independently and maintains those statistics at a local cache. In embodiments, the delta values are pulled with TCP-like reliable transport. Accordingly, the current value at each designated device is the sum of the previous value of the designated device and all pulled delta values from each of its downstream member devices.

This pull model increases computing resource scalability on the analytics plane. To avoid the situation that all member switches report statistics data to their designated devices at the same time (or near the same time), such that the designated devices become overloaded, the designated device pull model is used to replace traditional member device push models. In some embodiments, designated devices will pull statistics data from its member switches only when its CPU is not overloaded.

Figure 4A:
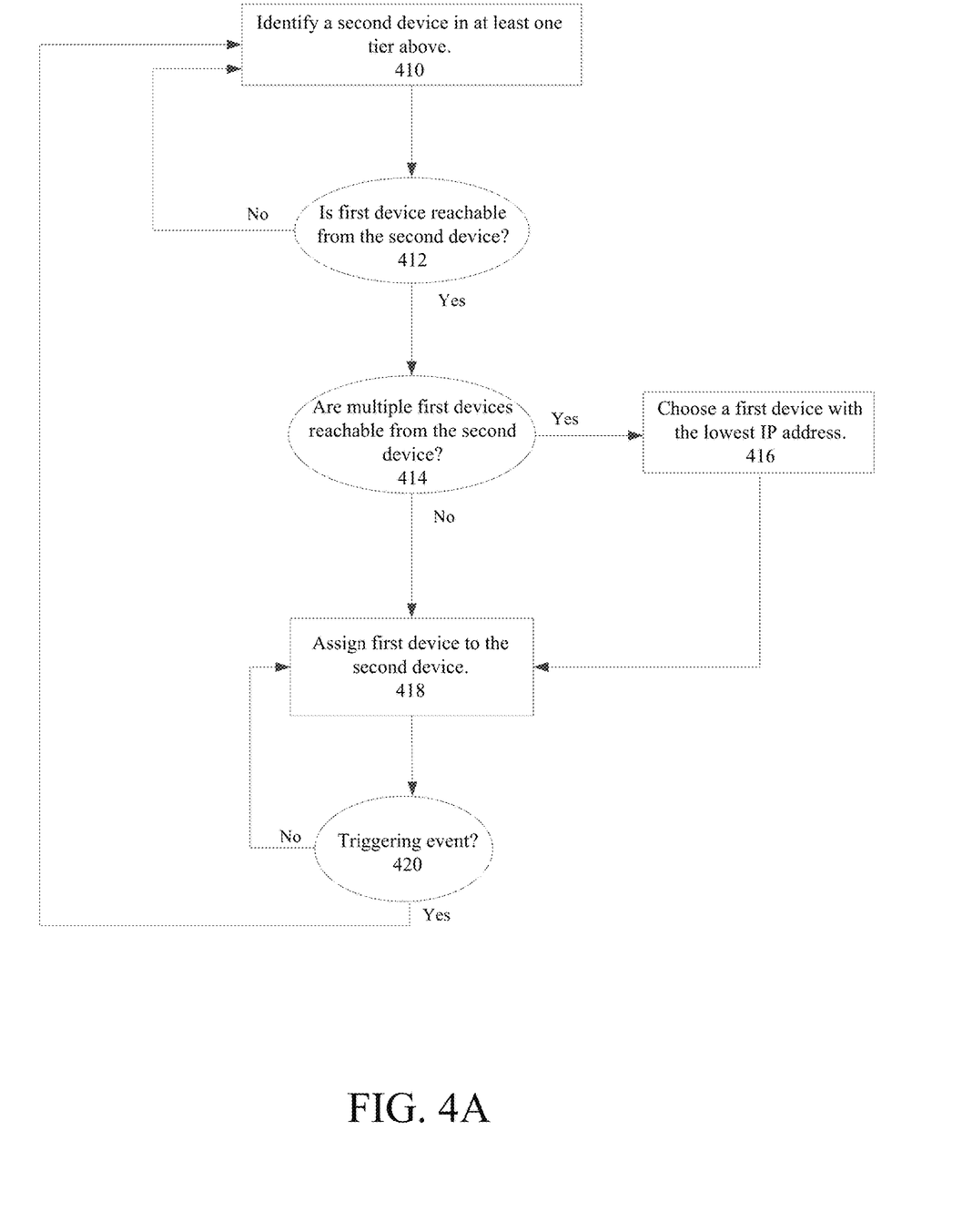
FIG. 4A is a flowchart illustrating an exemplary method for assigning roles on the analytics plane.

A stats device can, in some embodiments, automatically choose a designated device as its upstream device. FIG. 4A shows a flowchart illustrating an exemplary method for assigning roles on the analytics plane according to various embodiments. For each analytics agent installed on a stats device, selection service 130 identifies at least one other upstream device. This can be a device on at least one tier above the member device (step 410).

Thus, for each member device considering a potential designated device, it is determined whether the member device is reachable from the potential designated device (step 412). If the member device is reachable from the potential designated device, then the potential designated device sends a message to the member device that it is willing to be a designated device. Additionally and/or alternatively, if it is determined that multiple potential designated devices are reachable from the member device (step 414), then a potential designated device with the lowest IP address is chosen by the member device (step 416).

Once the potential designated device receives confirmation from the member device (e.g., the member device sends a message to the potential designated device that it is willing to be a member device), the member device is assigned and the potential designated device becomes the designated device of the member device (step 418).

Whenever a stats device on the analytics plane goes down, it will re-trigger the process above to recalculate the aggregation tree to reflect the current topology. Thus, a triggering event will cause the stats device to, once again, select a designated device (step 420) and start the process over.

Whether a stats device on the analytics plane goes down can be detected by a regular heart-beat mechanism. Each device on the analytics plane, for example, will exchange heart-beat messages with its upstream DSD device and its downstream MSD devices periodically in configurable intervals. If a heartbeat message isn't received from its upstream or downsgtream devices for a configurable multiple number of consecutive intervals, that device is considered as going down, which will trigger the process is defined in FIG. 4B to regenerate the DSD/MSD tree on the analytics plane.

Additionally and/or alternatively, storage on the analytics plane is scalable as well. Referring to FIG. 2, in some embodiments, global observable objects, such as a user configured ACL rule, can enable making storage complexity independent of the number of virtual switches connected to a physical switch. For example, if one ACL rule defines the contract between two end-point groups, and the rule is installed on both the virtual switches (ovs1 240 and ovs2 260) as well as on leaf2 214, the same rules installed on different switches, physical or virtual, is aggregated into one single observable rule object. Since the number of endpoints (virtual machines and/or containers) and virtual switches has the potential to increase expoenentially and dynamically, aggregation into one observable rule object is desireable. This is because if separate observable objects represented the same contract rule installed on different physical or virtual switches, aggregating statistics from virtual switches to physical switches could consume tremendous space as the number of end-points, rules and virtual switches explode in number. Each rule takes a linear number of copies proportional to the number of virtual switches, for example, and thus aggregation into one observable rule object reduces space complexity from O(N) to O(1) (e.g., linear space complexity is reduced to constant space complexity).

Figure 4B:
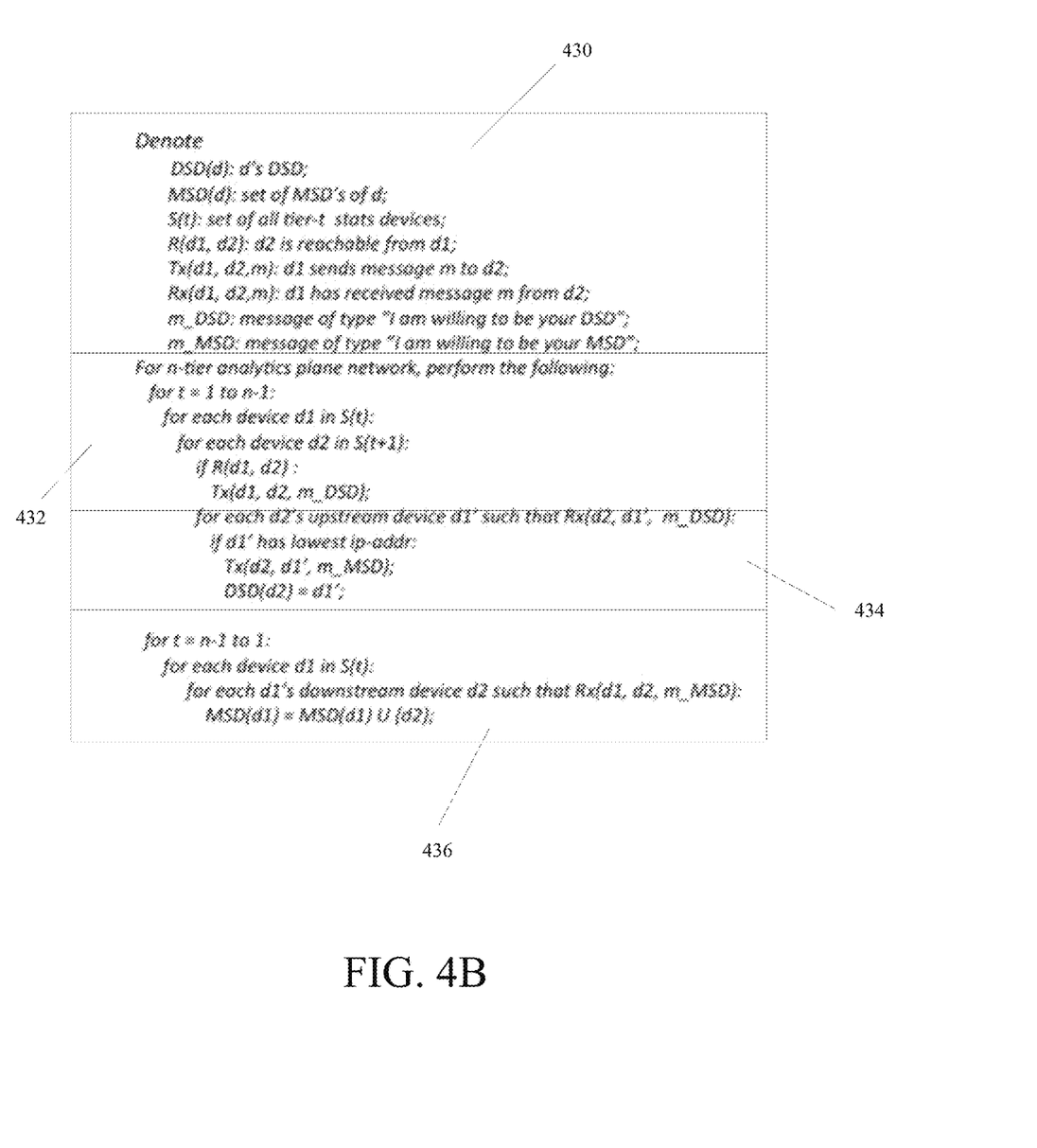
FIG. 4B is an example block diagram illustrating an exemplary calculation of a statistics aggregation tree across an n-tier data center or cloud.

FIG. 4B shows an example block diagram that illustrates a calculation of a statistics aggregation tree across a data center or cloud. While some code elements are illustrated, this is for explanatory purposes only, and the present technology should not be considered limited by this code.

Definitions 430 define variables used to calculate the aggregation tree, such as: DSD(d) being defined as device d's designated device; R(d1, d2) being defined as a condition that device 2 is reachable from device 1; Tx(d1, d2, m) being defined as device 1 sending a message m to device 2 (where m can be one of two types of messages, such as m_DSD being a message of type "I am willing to be your DSD" and m_MSD being a message of type "I am willing to be your MSD"); Rx (d1, d2, m) being defined as the condition that device 1 has received message m (of type m_DSD or m_DSD) from device 2; etc.

Block 432 defines instructions that, for an analytics plane network comprised of n tiers, for each device 1 in the set of tier-t stats devices (say, tier 1) and for each device 2 in the set of stats devices in the tier below (say, tier 2), if device 2 is reachable from device 1, then device 1 sends a message to device 2 of type "I am willing to be your DSD."

However, device 1 is not assigned as device 2's designated device until device 2 confirms. Block 436 says that for each device 1 in the set of tier-t stats devices (e.g., tier 1), for each device 1's downstream device (e.g., device 2) such that device 1 has received a message from device 2 of type "I am willing to be your MSD," then the member device of device 1 is defined as the union of the other member devices of device 1 and device 2 (e.g., device 2 is added to the set of device 1's member devices).

Figure 5:
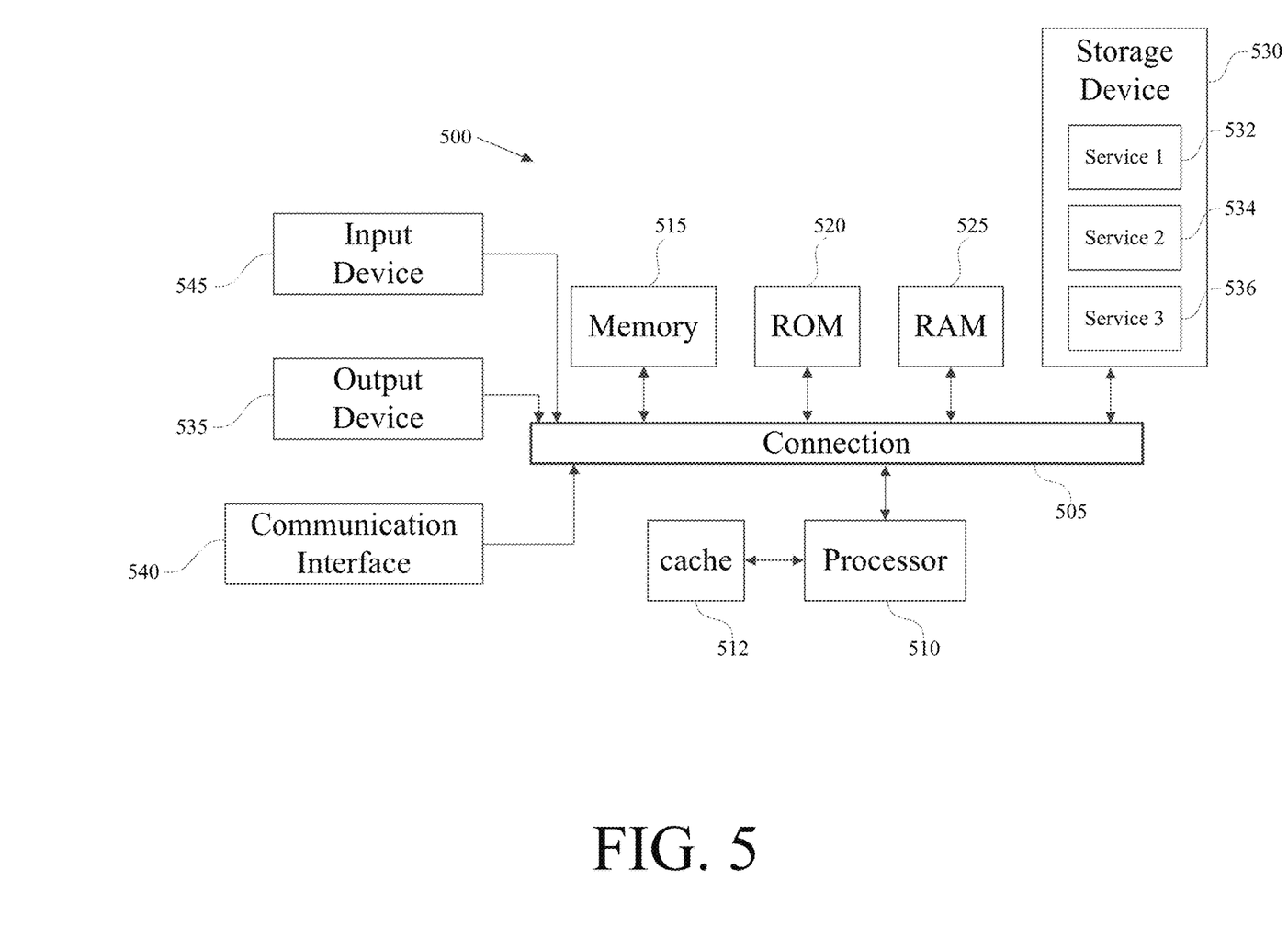
FIG. 5 shows an example of a system for implementing certain aspects of the present technology.

In the case of multiple devices being eligible for assignment as a designated device, Block 434 defines instructions that enable device 2 to choose its designated device among them. In Block 434, for each device 2's upstream device (say device 1') in the set of devices in tier 1, such that device 2 has received a message from its upstream device 1' of type "I am willing to be your DSD", if upstream device 1' has the lowest IP address, then device 2 sends a message to upstream device 1' of type "I am willing to be your MSD" (e.g., confirms the assignment). The designated device of device 2 is accordingly defined as upstream device 1'. FIG. 5 shows an example of computing system 500 in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for data collection and aggregation for logical objects of an application centric network, the system comprising:
   one or more processors; and
   at least one computer-readable storage medium having stored thereon instructions which, when executed by the one or more processors, cause the system to:
      assume a role of a Designated Stats device or a Member Stats device;
      in response to assuming the role of the Designated Stats device:
         receive data reported from a downstream Member Stats device communicated over an analytics plane associated with the application centric network; and
         aggregate data from downstream Member Stats devices belonging to a same logical object, the same logical object comprising at least an access control list rule configured on the downstream Member Stats devices; and
      in response to assuming the role as the Member Stats device:
         select an upstream Designated Stats device to report statistics to; and
         report the statistics to the selected upstream Designated Stats device over the analytics plane.

2. The system of claim 1, the at least one computer-readable storage medium storing instructions which, when executed by the one or more processors, cause the system to:
   assume the role of a combined Designated-Member Stats Device;
   in response to assuming the role as the combined Designated-Member Stats device, receive data reported from the downstream Member Stats device communicated over the analytics plane;
   aggregate data from the downstream Member Stats device belonging to the same logical object; and
   send the aggregated data over the analytics plane to the selected upstream Designated Stats device.

3. The system of claim 1, the at least one computer-readable storage medium storing instructions which, when executed by the one or more processors, cause the system to:
   re-elect a different role based at least in part on not receiving a heartbeat message from one or more of the upstream Designated Stats device or the downstream Member Stats device for a configurable multiple number of consecutive intervals.

4. The system of claim 1, wherein the analytics plane comprises at least one stats device, and wherein the analytics plane elects roles automatically and provides data collection and aggregation for logical objects of the application centric network.

5. The system of claim 1, wherein at least one a of the downstream Member Stats devices comprises one or more of a virtual machine or container, and wherein the selected upstream Designated Stats device comprises a controller.

6. The system of claim 1, wherein the selected upstream Designated Stats device is selected based at least in part on the selected upstream Designated Stats device being upstream from the system by one device.

7. The system of claim 1, wherein the selected upstream Designated Stats device is selected based at least in part on the system being reachable from the selected upstream Designated Stats device.

8. The system of claim 1, wherein the Designated Stats device is assigned to multiple Members Stats devices, the multiple Member Stats devices being all downstream devices that have chosen the Designated Stats device.

9. The system of claim 1, wherein multiple Designated Stats devices are reachable by the Member Stats device, and wherein the selected upstream Designated Stats device is selected to be a Designated Stats device with the lowest IP address.

10. The system of claim 1, the at least one computer-readable storage medium storing instructions which, when executed by the one or more processors, cause the system to:
    determine that the Member Stats Device has selected another Designated Stats device in response to a triggering event.

11. The system of claim 10, wherein the triggering event is at least one of the Designated Stats device going down, the Member Stats device going down, or a user configuration change.

12. The system of claim 1, wherein the analytics plane comprises an overlay plane that is different from a control plane associated with the application centric network and a data plane associated with the application centric network.

13. The system of claim 1, wherein data is aggregated according to an observable object, wherein the observable object is a logical object that is deployed distributedly one or more access control rules.

14. The system of claim 1, wherein the Designated Stats Device pulls the statistics from its downstream Member Stats devices.

15. A method for data collection and aggregation for logical objects of an application centric network, the method comprising:
- defining a role of a device an analytics agent as one of a Designated Stats device or a Member Stats device;
- in response to defining the role of the device as the Designated Stats device:
  - receiving data reported from a downstream Member Stats device communicated over an analytics plane associated with the application centric network;
  - aggregating data from downstream Member Stats devices belonging to a same logical object, the same logical object comprising at least an access control list rule configured on the downstream Member Stats devices; and
- in response to defining the role of the device as the Member Stats device:
  - selecting an upstream Designated Stats device to report statistics to; and
  - reporting the statistics to the selected upstream Designated Stats device over the analytics plane.

16. The method of claim 15, further comprising re-electing the role of the device based at least in part on not receiving a heartbeat message from one or more of the upstream Designated Stats device or the downstream Member Stats device for a configurable multiple number of consecutive intervals.

17. The method of claim 15, wherein the analytics plane comprises a collection of analytics agents communicating with each other, wherein the analytics plane elects roles automatically and provides data collection and aggregation for logical objects of the application centric network.

18. The method of claim 15, wherein at least one of the downstream Member Stats devices comprises one or more of a virtual machine or container, and wherein the selected upstream Designated Stats device comprises a controller.

19. The method of claim 15, wherein the selected upstream Designated Stats device is selected based at least in part on the selected upstream Designated Stats device being upstream one device from the device.

20. The method of claim 15, wherein the selected upstream Designated Stats device is selected based at least in part on the Member Stats device being reachable from the selected upstream Designated Stats device.

* * * * *